(12) United States Patent
Lee

(10) Patent No.: US 6,404,708 B1
(45) Date of Patent: Jun. 11, 2002

(54) OPTICAL DATA-STORAGE APPARATUS EMPLOYING OPTICAL MEDIA WITH THREE-DIMENSIONAL DATA PATTERN

(76) Inventor: Howard Hong-Dough Lee, 4350 Derry Rd., Bloomfield, MI (US) 48302

(*) Notice: Subject to any disclaimer, the term of this patent is extended or adjusted under 35 U.S.C. 154(b) by 0 days.

(21) Appl. No.: 09/165,890

(22) Filed: Sep. 30, 1998

(51) Int. Cl.⁷ .................................................. G11B 7/00
(52) U.S. Cl. .............................. 369/36.01; 369/34.01; 369/30.34
(58) Field of Search ................................ 369/111, 112, 369/44.37, 100, 103, 97, 96, 113, 30.33, 30.34, 30.49, 36.01, 37.01, 38.01, 39.01, 30.46, 34.01

(56) References Cited

U.S. PATENT DOCUMENTS

| | | | | |
|---|---|---|---|---|
| 1,978,183 A | * | 1/1934 | Alexanderson | 369/111 |
| 2,142,391 A | * | 1/1939 | Fuschi | 369/112 |
| 4,682,321 A | | 7/1987 | Takaoka et al. | 360/284 |
| 5,081,617 A | | 1/1992 | Gelbart | 369/112 |
| 5,255,260 A | | 10/1993 | Yamada et al. | 369/199 |
| 5,487,060 A | | 1/1996 | Rosen et al. | 369/118 |
| 5,659,533 A | | 8/1997 | Chen et al. | 360/112 |
| 5,706,269 A | * | 1/1998 | Ogura et al. | 369/94 |
| 5,748,575 A | | 5/1998 | Lee | 369/30 |
| 6,094,410 A | * | 7/2000 | Fan et al. | 369/94 |

* cited by examiner

Primary Examiner—Thang V. Tran
(74) Attorney, Agent, or Firm—Hartman & Hartman, P.C.

(57) ABSTRACT

An optical data-storage medium comprises a base structure adapted to supply a peripheral surface with a medium adhered thereon, forming a data surface responsive to a light beam for providing optical signals corresponding to a plurality of data, wherein the plurality of data are arranged in a three dimensional pattern, most preferably, a plurality of helixes suitable for application of parallel processing of information. For this purpose, an optical data-storage apparatus is designed from a single platform to accommodate the optical data-storage medium rotatable therein about an axial line at a steady and constant speed, and to allow a plurality of optical heads each capable of providing a light beam jointly movable in a direction generally parallel to the axial line so as to simultaneously process a plurality of data bits at a time, i.e., in parallel. Thus, the optical data-storage apparatus can serve as high-performance secondary and tertiary storage, can allow a user to directly plug-and-play software from original data-storage media, and can process information in true multitasking and in parallel, increasing a data throughput by at least a 10-fold as compared with any conventional optical-disc drives.

12 Claims, 9 Drawing Sheets

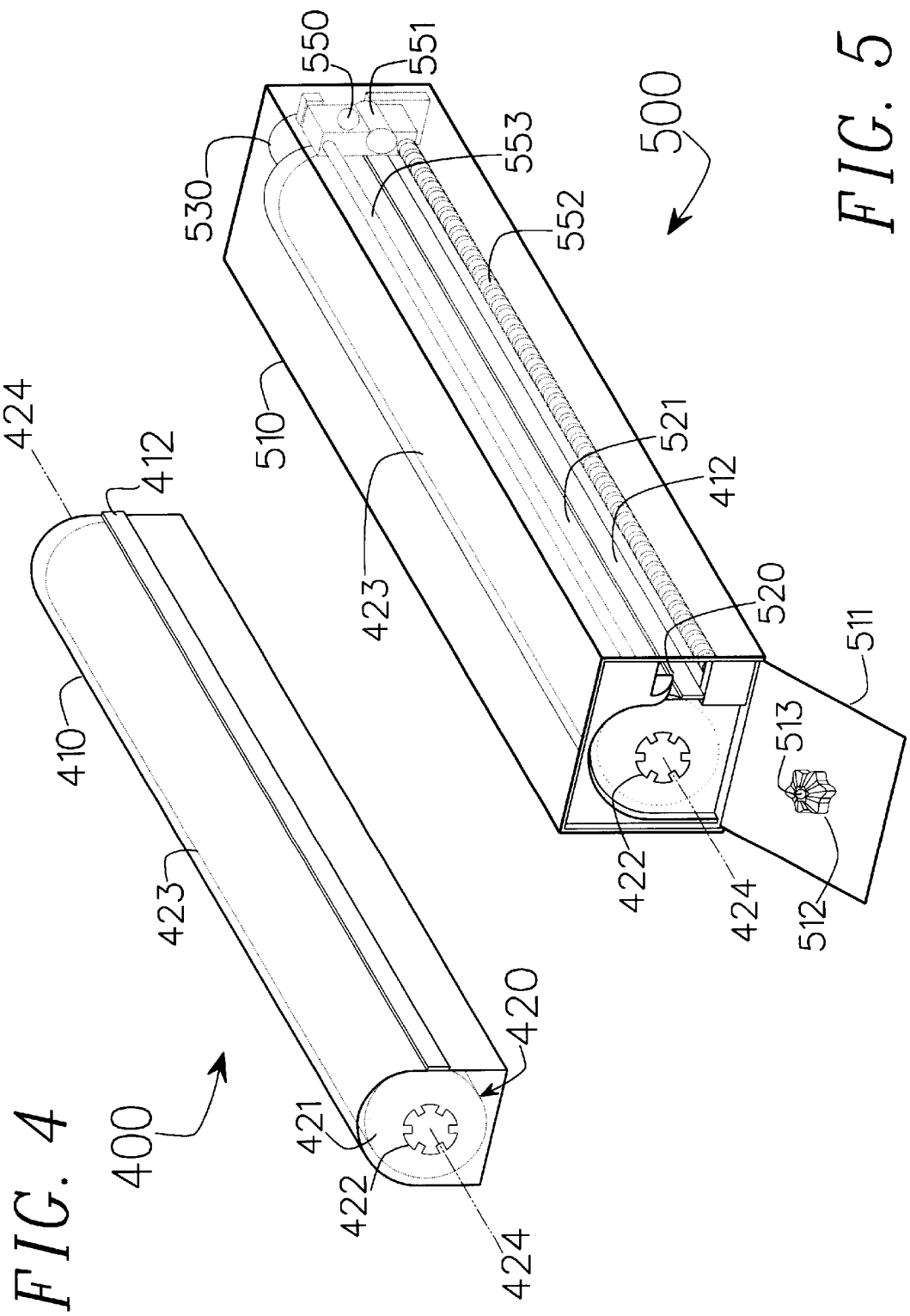

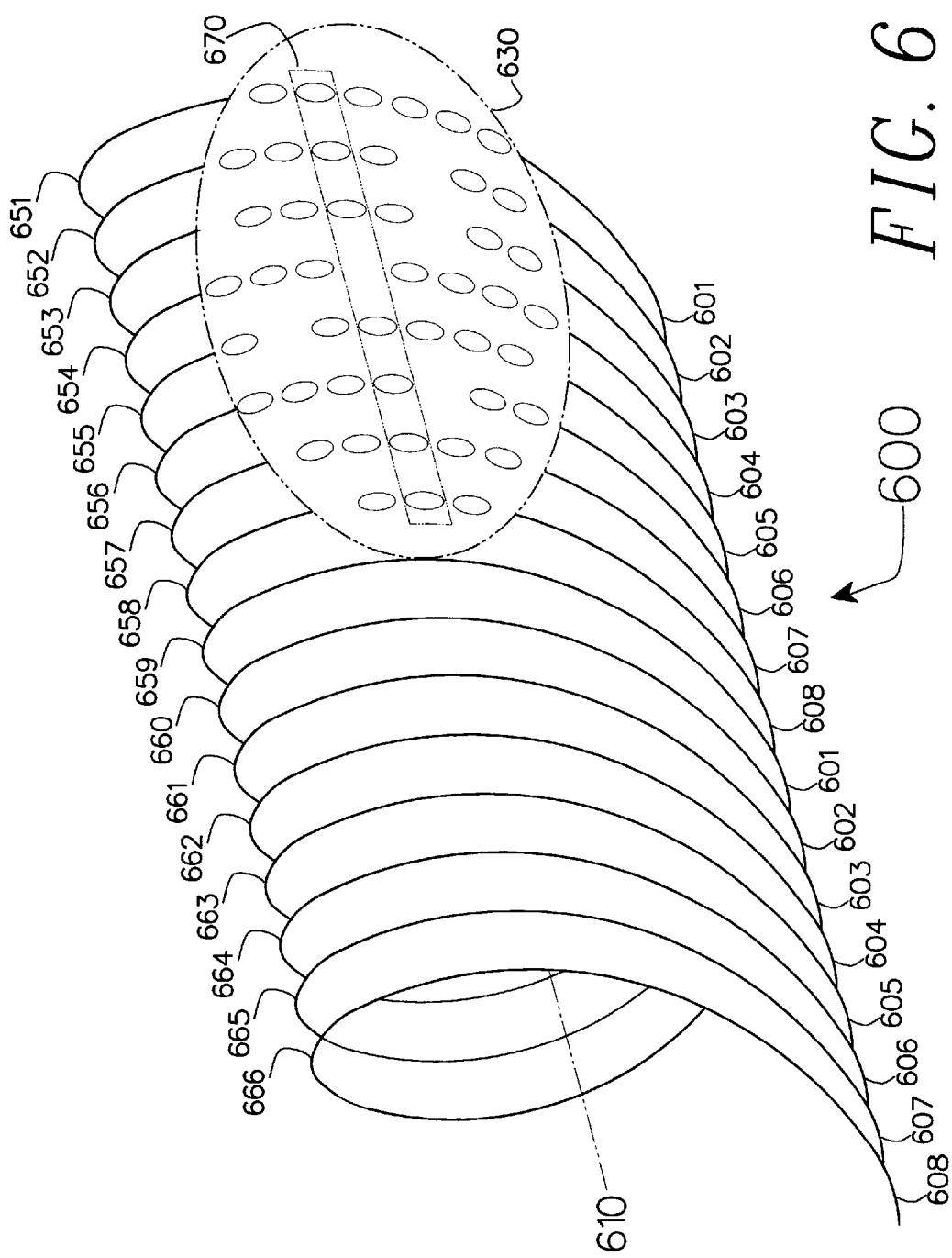

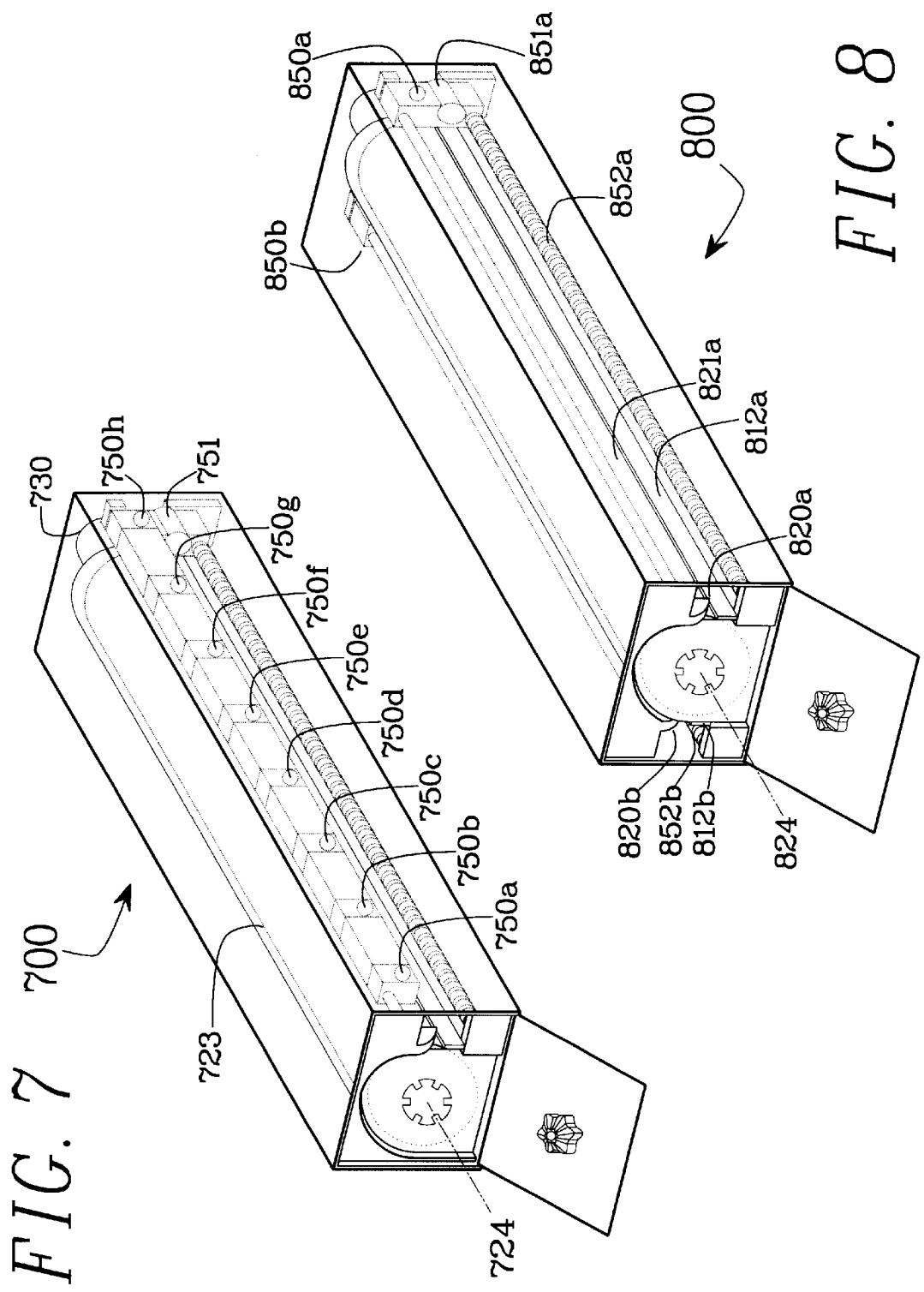

OPTICAL DATA-STORAGE APPARATUS EMPLOYING OPTICAL MEDIA WITH THREE-DIMENSIONAL DATA PATTERN

FIELD OF THE INVENTION

The present invention relates generally to the field of optical data-storage apparatuses, and more particularly to an optical data-storage apparatus employing optical data-storage media having a three-dimensional data pattern for processing information in multitasking and in parallel.

BACKGROUND OF THE INVENTION

It is well known that a conventional computer system is nowadays generally equipped with a hard-disk drive, a removable-disk drive, a CD (compact-disc) drive, a floppy-disk drive, and/or a tape-backup drive for storing information. These drives basically utilize storage media such as magnetic disks, Bernoulli disks, optical/magneto-optical discs, and magnetic tapes, respectively. Among these media, magnetic tapes and even newly developed optical tapes are for use only in tertiary storage because information is stored thereon by a sequential access method and thus cannot be accessed at a speed acceptable by current computer practice.

The coexistence of hard-disk, CD, floppy-disk, backup, and other removable drives in computer signifies the fact that no single drive can simultaneously serve as secondary and tertiary storage. However, their combinations do not yield satisfactory overall performance because these conventional drives use different platforms and storage media in construction. Nor, can their combinations result in a user-friendly feature, because the conventional practice requires a purchased software program to go through a tedious software installation process through which all program files are decompressedly copied from an original software CD or floppy disks to a hard-disk drive wherefrom the software program is then executed.

In an attempt to resolve the disadvantages mentioned above and to allow software programs to be launched directly from their original discs just as the plug-and-plan feature of a SEGA- or Nintendo-type game system, Applicant has disclosed an information processing apparatus (called master drive hereinafter) to replace all of these conventional hard-disk, CD, floppy-disk, backup, and other removable drive, as detailed in U.S. Pat. No. 5,748,575. The master drive is in a single-platform construction utilizing optical discs as storage media so as to most-efficiently obtain all necessary functions and features of secondary and tertiary storage.

Among the conventional storage media between magnetic disks and optical discs, Applicant has suggested only the optical-disc media suitable for achieving the plug-and-play feature of software programs in conjunction with the master drive. Magnetic disks, due to lack of durability and storage density, are by no means suitable media for achieving the plug-and-play feature of software, that is one of the basic characteristics needed to form the master drive of my prior invention.

Conventional optical storage basically utilizes either optical discs or optical tapes as storage media. Comparably inferior to magnetic tapes, optical tapes are only suitable for applications in tertiary storage and will not be applicable for use in the master drive of my prior patent. Thus, among the conventional optical storage, only optical-disc media can be utilized in conjunction with secondary and tertiary storage. The optical disc medium is essentially a relative "flat" or two-dimensional plate having circular tracks made in a continuous spiral or many spirals from the inside to the outside of an optical disc. With respect to the so-called DVDs (digital video or versatile discs), information is stored on two layers (U.S. Pat. No. 4,682,321) or multiple surfaces (U.S. Pat. No. 5,487,060) at ifs different depths so as to greatly increase data density. Even though, these types of discs and their data surfaces are still generally in flat or two-dimension form.

Relatively recently, Applicant has discovered that the master drive utilizing the conventional optical-disc media may have an oversized plane that would prevent it from being integrated with a space-limited host for some particular applications. There appears no immediate solution for the concern if several turntables have to be generally aligned horizontally with each other. Furthermore, in such a master drive, each turntable is designed for mounting a disc thereon and the total number of discs will be fixed in accordance with the total number of the turntables. Thus, it is impossible to increase the total number of mountable discs. In other words, the optical-disc-based master drive may lack of flexibility in accommodating original software discs more than the turntables provided therein, even though some software discs contain much less data than others and each of them has to equally occupy a turntable.

Another Applicant's concern is how to raise the data transfer rate (or data throughput) of conventional optical data storage to a level comparable to that of a hard-disk drive utilizing magnetic-disk media. An earliest CD-ROM drive used in conjunction with a computer system has a characteristic of doublespin or the so-called 2×, equivalent to a data throughput of 0.3 MBps. The latest CD-ROM drives have advanced to 32× or a data throughput of 4.8 MBps. On the other hand, the newest CD-R (rewritable or recordable) drives remain to be 8× at best yet cost about a 10-fold higher than a typical 32× CD-ROM. To achieve a data throughput of 16.6 MBps that is nowadays typical in any hard-disk drives, a CD-ROM drive has to evolve into at least 110× that will minimally rotate from 55,000 rpm at start-up to 22,000 rpm at the outside edge of an 120 mm disc. This range of rotation speed reaches about an order of magnitude greater than a typical hard-disk drive, which will invoke technology far beyond our current knowledge and technological capability, especially, in view of the fact that the latest CD-R drives remain to be mostly in 2×.

With respect to CD-R drives, the most serious obstacle hindering their advance in speed is that the parameter of time is often essential for a material to transform between different states of phases or for a polymeric carry medium in a magneto-optical disc to be softened enough upon being exposed to an intense laser beam to allow embedded magnetically-sensitive, metallic crystals to undergo re-aligning movements. Thus, there is a strong need to conceive a new form of high-density optical-storage media and a new type of optical storage utilizing such a high-density optical-storage media different from the conventional optical-disc media used in current CD and/or CD-R drives so as to achieve a data throughput at a minimal level of a hard-disk drive.

With the concerns just mentioned hereinabove, Applicant now establishes the need, the incentive, and the application for developing a new form of optical-storage media and a new type of optical storage utilizing the new form of optical-storage media to achieve a throughput speed at least comparable to any current hard-disk drives.

SUMMARY OF THE INVENTION

A first feature of the present invention is to improve the conventional optical information reproduction system by providing an optical data-storage medium with a base structure adapted to supply a peripheral surface, preferably in cylindrical form, with a medium adhered thereon, forming a three-dimensional data surface responsive to a light beam for providing optical signals corresponding to a plurality of data. The three-dimensional data surface having an imaginary straight center line is preferably selected from the group consisting of at least one helix, at least one ring, at least one circular track, at least one three-dimensional coil, at least one three-dimensional spiral, and their combinations. Preferably, the medium is responsive to an intense light beam to undergo changes between different states of phases or orientations for rewritably storing data thereon. The peripheral surface may contain at least one additional medium disposed with the medium to form a plurality of data surfaces at different depths each for storing a plurality of data thereon. Most preferably, the plurality of data are arranged in a pattern comprising a predetermined plurality of helixes alternately disposed, so as to process information in parallel manner. The helixes may be used for storing different formats of information, such as digital data information and digital audio information.

A second feature of the present invention is to improve the conventional optical information reproduction system by providing an optical data-storage cartridge comprising a housing, a plurality of data-storage media rotatably mounted in the housing, each of the optical data-storage media having (1) a base structure adapted to supply a peripheral surface and an axial line of rotation and (2) a medium adhered on the peripheral surface, forming a data surface responsive to a light beam for providing optical signals corresponding to a plurality of data stored thereon, and at least one opening disposed on the housing adapted to allow the peripheral surfaces to be accessed outside the housing in a direction generally parallel to the axial lines. The housing protects the optical data-storage media of the invention and facilitates removability.

A third feature of the present invention is to improve the conventional optical information reproduction system by providing an optical data-storage apparatus comprising mounting means rotatable about an axial line, for mounting thereon an optical data-storage medium of the invention, means for rotating the mounting means about the axial line, and an optical unit having an optical head means capable of providing a light beam and a driving means for moving the optical head means in a direction generally parallel to the axial line, so as to interface with the optical data-storage medium. Specifically, the optical head means is adapted to allow the light beam to be directed to and reflected from the optical data-storage medium in directions generally perpendicular to the axial line. Preferably, the optical head means further comprises means for sequentially focusing the light beam selectively between a predetermined plurality of distances, so as to access a respectively predetermined plurality of data surfaces on the optical data-storage medium. The optical head means may be adapted to shape the light beam into a narrow-lined light beam with predetermined dimensions to cover a predetermined plurality of data bits adjacently aligned with each other in a direction generally parallel to the axial line. The optical unit may further comprise additional optical head means each discretely spaced apart from and substantially aligned with the optical head means in a direction generally parallel to the axial line. Provided therewith is means for processing a predetermined plurality of data bits each associated with a predetermined one of the optical head means and the additional optical head means in parallel manner. Most preferably, the mounting means is adapted to removably mount thereon a plurality of optical data-storage media of the invention. The optical data-storage apparatus may further comprise a second mounting means rotatable about a second axial line for mounting a second optical data-storage medium, wherein the second axial line is generally parallel to the axial line. The optical unit further comprises a second driving means for moving the optical head means in a direction substantially traverse to the axial line and the second axial line, so as to allow the optical head means to selectively access the optical data-storage medium and the second optical data-storage medium. Further provided is a second optical unit having a separate driving means and at least one separate optical head means, so as to allow the optical unit and the second optical unit to perform multi-tasking. The optical data-storage apparatus may further comprise another mounting means rotatable about another axial line for mounting a conventional optical disc medium having a two-dimensional surface for storing information thereon.

A fourth feature of the present invention is to improve the conventional optical information reproduction system by providing an optical data-storage apparatus comprising a plurality of optical data-storage media each adapted to have a data surface for storing a plurality of data arranged in a three-dimensional pattern having an imaginary straight center line, a plurality of mounting means each rotatable about an axial line for mounting thereon one of the optical data-storage media in such a manner as to allow the imaginary straight center lines each to coincide with a respective one of the axial lines, means for rotating the plurality of mounting means each about a respective one of the axial lines, and an optical unit comprising a plurality of optical head means and a driving means for simultaneously moving the plurality of optical head means in a traveling direction generally parallel to at least one of the axial lines. Specifically, each of the plurality of optical head means is adapted to provide a light beam directed to and reflected from a respective one of the data surfaces in a direction generally perpendicular to a respective one of the axial lines. Preferably, one of the optical head means comprises means for sequentially focusing a light beam selectively between a predetermined plurality of distances, so as to access a respectively predetermined plurality of data surfaces on one of the optical data-storage media. One of the optical head means may be adapted to shape a light beam into a narrow-lined light beam with predetermined dimensions to cover a predetermined plurality of data bits adjacently aligned with one another in a direction generally parallel to one of the axial line. Preferably, the plurality of optical head means are aligned with each other in a direction generally parallel to a predetermined one of the axial lines, so as to allow a selected plurality of the optical head means to access a respectively predetermined one of the optical data-storage media. Most preferably, the optical data-storage apparatus further comprises means for processing a predetermined plurality of data bits each associated with a predetermined one of the plurality of optical head means in parallel manner. Specifically, the means for processing is provided selectively for combining the predetermined plurality of data bits retrieved by the plurality of optical head means in a predetermined sequence, and for separating data in accordance with the predetermined sequence to a form of the predetermined plurality of data bits to be sent through respective optical head means for storing onto respective optical data-storage media. At least one of the mounting means each is adapted to removably mount thereon at least one of the optical data-storage media of the present invention. Preferably, the plurality of optical head means are arranged in such a manner as to allow at least one of the plurality of optical head means to be positioned at each one of the plurality of optical data-storage media. The optical data-storage apparatus may further comprise an additional optical unit having at least one optical head means, a first driving means, and a second driving means provided for moving the at least one optical head means respectively in a first direction generally parallel to and in a second direction substantially traverse to at least two of the axial lines, so as to allow the second optical unit to selectively access at least two of the optical data-storage media. The optical data-storage apparatus may further comprise a turntable rotatable about a turntable axial line for mounting a conventional optical disc having a two-dimension surface for storing information thereon. Preferably, the turntable and the head unit are arranged in such a manner as to allow one of the plurality of optical head means to travel in a radial direction of a disc surface of the optical disc medium.

An optical data-storage medium of the present invention allows information to be stored in high density, to be accessed in high speed, and to be processed in multitasking and in parallel, not achievable by any conventional optical disc drives.

DESCRIPTION OF THE DRAWINGS

FIG. 4 is a perspective view of an optical data-storage cartridge in accordance with a second primary preferred embodiment of the present invention.

FIG. 5 is a perspective view of an optical data-storage apparatus in accordance with a third primary preferred embodiment of the present invention.

FIG. 6 is an enlarged view showing a pattern of data tracks arranged in eight alternate helixes of the present invention.

FIG. 7 is a perspective view of an optical data-storage apparatus with parallel processing capability of the present invention.

FIG. 8 is a perspective view of an optical data-storage apparatus with multitasking capability of the present invention.

DETAILED DESCRIPTION OF THE PREFERRED EMBODIMENTS

Figure 1:
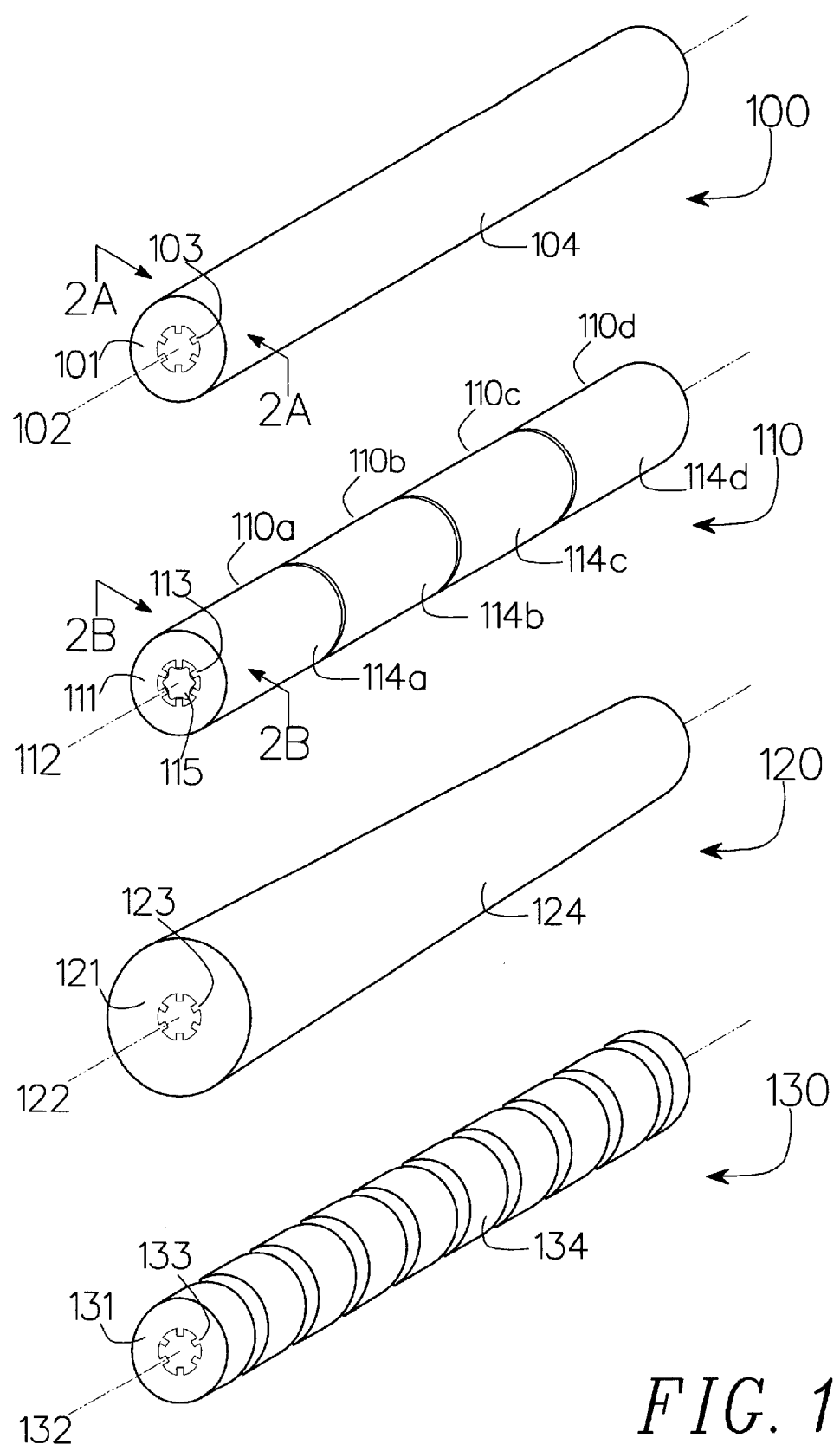
FIG. 1 is a perspective view of optical data-storage media each having at least one peripheral surface that is relatively symmetrical in shape along a respective imaginary straight center line in accordance with a first primary preferred embodiment of the present invention.
Figure 2A:
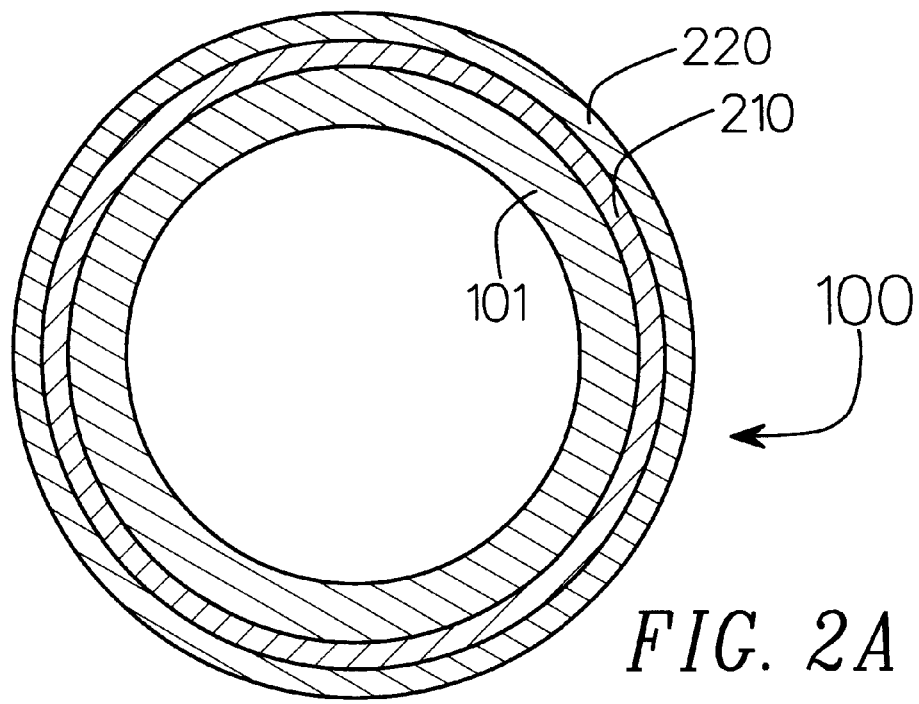
FIGS. 2A and 2B are cross-sectional views of optical data-storage media 100 and 110 along the lines 2A—2A and 2B—2B respectively shown in FIG. 1.
Figure 2B:
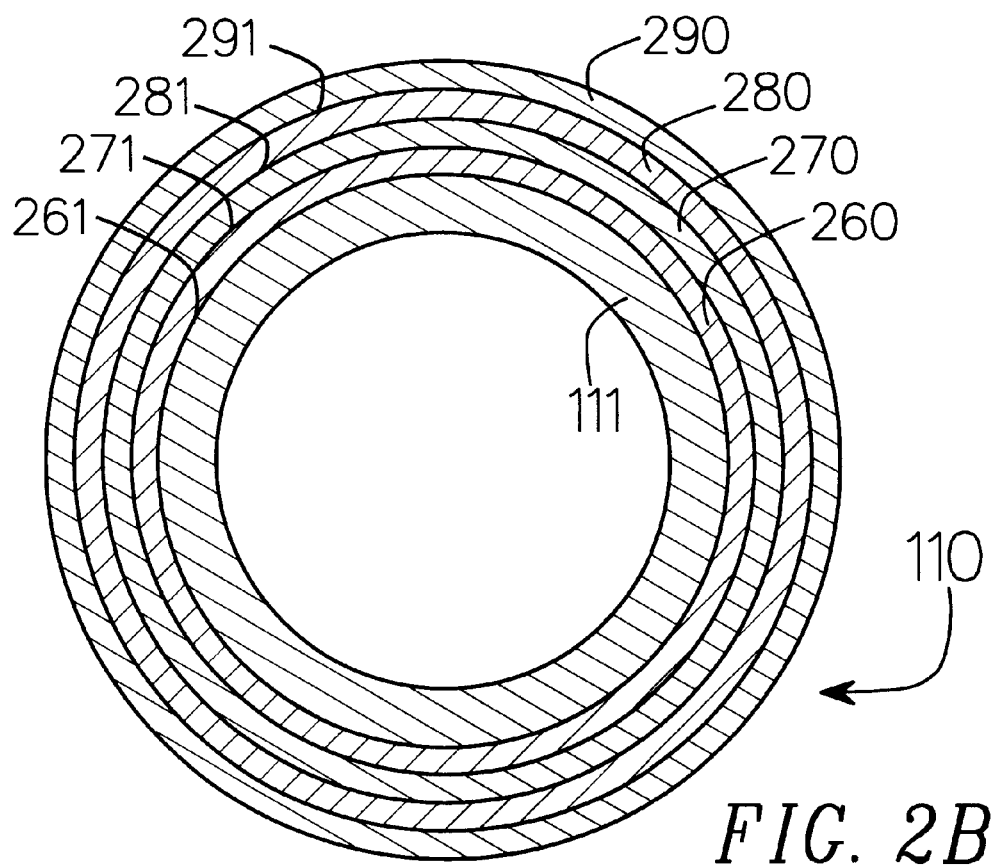
Figure 3:
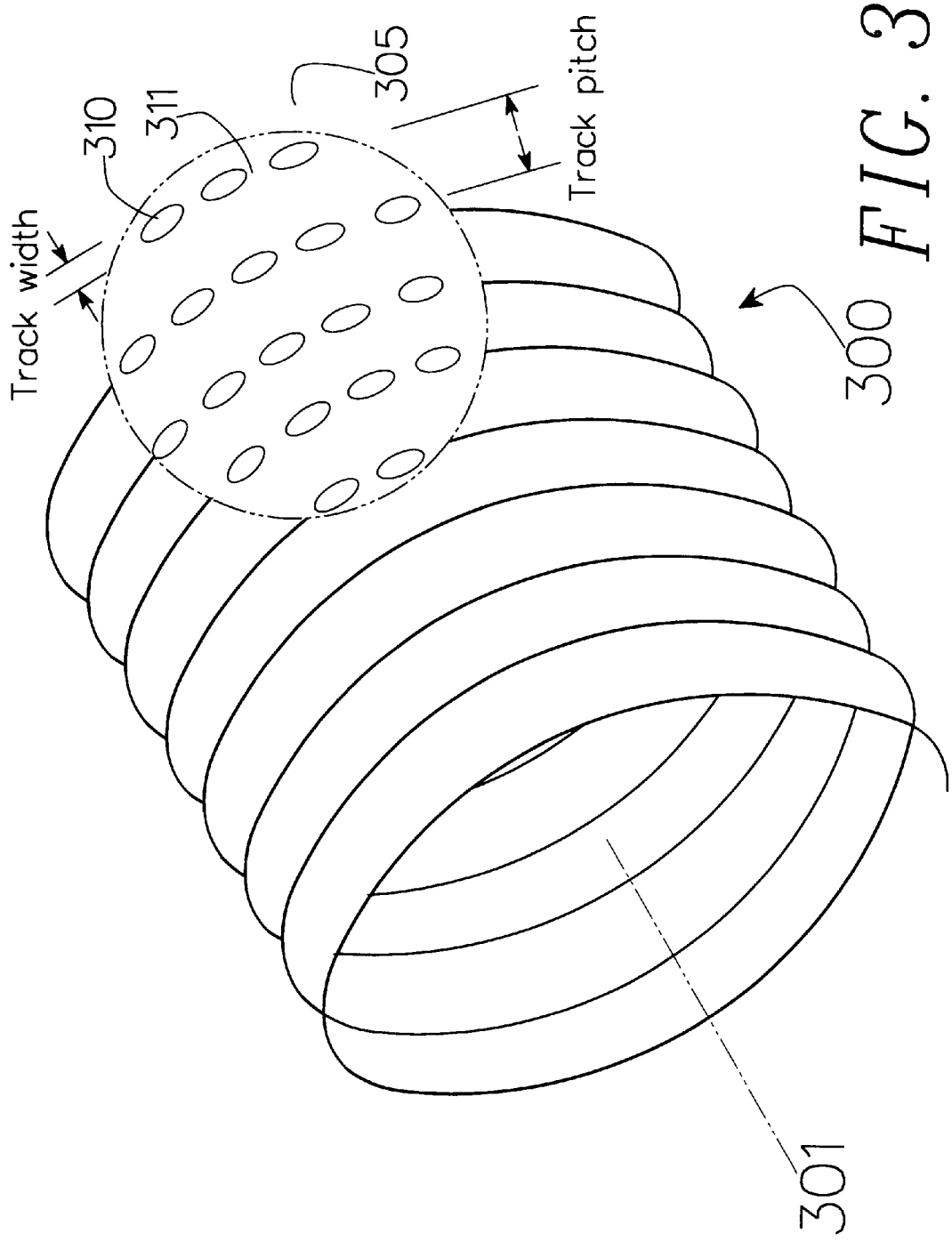
FIG. 3 is an enlarged view showing a pattern of data tracks arranged in a single helix of the present invention.

Referring now to FIGS. 1–3, the first primary preferred embodiment of the present invention will be described in detail hereinbelow.

FIG. 1 is a perspective view of optical data-storage media 100, 110, 120, and 130. Optical data-storage media 100, 120, and 130 each comprises a respective base structure 101, 121, or 131. The base structures each is adapted to supply a peripheral surface in three-dimensional form such as a hollow (preferred) or solid cylinder or truncated cone, and to have mounting means 103, 113, 123, or 133 engageable for mounting onto an optical data-storage apparatus to be detailed in FIGS. 5, 7, or 10 of the present invention. Preferably, the base structure and the engagement means are one piece plastic component made of a material such as polycarbonate, polyacrylic resin, or other polymers through precision blow molding or other processing versus injection molding used in the making of conventional compact discs.

Optical data-storage medium 110 currently mounted on a common shaft 115 includes four shorter elongated-length optical data-storage media 110a–110d with separated base structures each in cylindrical form with a diameter of 30 mm identical to optical data-storage media 100 and 130, but 40 mm in length versus 120 mm of the other three optical data-storage media 100, 120, and 130.

Each of the base structures has one peripheral surface that is relatively symmetrical in shape along a respective one of imaginary straight center line 102, 112, 122, or 132. In accordance with the first primary preferred embodiment of the present invention, the mounting means each is adapted to have an axial line of rotation coaxial with a respective one of imaginary straight center lines 102, 112, 122, and 132. Each of the peripheral surfaces contains at least one data surface capable of storing a plurality of data arranged in a three-dimensional pattern or circular boundary lines with centers moving along a respective one of imaginary straight center lines 102, 112, 122, or 132. More specifically, optical data-storage media 100 and 110 are in cylindrical form, while optical data-storage medium 120 is in truncated conical form. As depicted in optical data-storage medium 130, it is possible that a base structure is adapted in such a manner as to have a peripheral surface 134 substantially in helical shape (i.e., with two helical outer boundary lines) for storing a plurality of data arranged in helical form. It is also possible that the peripheral surface comprises boundary lines of segments of circles, although less preferred.

With respect to optical data-storage medium 100, its peripheral surface 104 has a length of 120 mm, yet a surface area about 121% of a single side of an 120-mm optical disc. In other words, the optical data-storage medium of the present invention with a length slightly less than a typical pen can have a storage capacity of about 787 megabytes (MB) if made in a single data-surface (or data-layer) format as used in conventional CD-ROM. This allows a new type of optical data-storage apparatus of the present invention to be constructed in a narrower and compact size as compared with convention optical-disc storage that has to be in dimensions of at least 120 mm×120 mm.

Each of peripheral surfaces 114a–114d on respective optical data-storage media 110a–110d has a length of 40 mm and a storage capacity of 197 MB if made in the single data-surface format, which is sufficient for holding most of software programs. It is also possible that common shaft 115 is mounted with optical data-storage media (or original software optical media) with various lengths so as to achieve different combinations. In accordance with the present invention, thus for the first time, several original software optical media with peripheral surfaces substantially symmetrical in shape can be mounted on a common shaft, so as to be readily accessed by an optical unit having at least one optical head (or pickup). Many software developers produce software discs with contents less than a full capacity (650 MB) of a typical 120-mm optical disc. Without the first primary preferred embodiment of the present invention, these unfilled software discs each has to occupy a turntable.

Shown in FIGS. 2A and 2B are cross-sectional views of optical data-storage media 100 and 110 along the lines 2A—2A and 2B—2B respectively depicted in FIG. 1. FIG. 2A is a single data-surface structure, in which base structure 101 (i.e., a hollow cylinder) is coated with a data medium forming a single data surface (or data layer) 210, which may be an evaporated aluminum film having a thickness of 0.1 to 0.2 $\mu$m, for serving as read-only-memory medium or storage. Data surface 210 is overcoated with a transparent, protective layer 220 with a thickness of about 0.2 to 0.8 mm. When exposed to a light beam, the data surface is responsive to provide optical signals corresponding to a plurality of data stored thereon.

For serving as rewritable storage, data surface 210 may be a magneto-optical medium comprising magnetically-sensitive, metallic crystals (such as barium ferrite) whose orientations are re-alignable only when exposed to an intense laser beam and magnetic impulse, thus being erasable/rewritable. The data surface of the crystals may have a thickness of 2 to 80 nm, which may be formed by vacuum deposition through sputtering processes known in the art. Data surface 210 may comprise other alternative rewritable media or films such as Ge-, Te-, and Sb-containing compounds known in the art, capable of undergoing reversible phase changes when exposed to an intense light beam.

FIG. 2B shows that optical data-storage medium 110 is in a multiple data-surface structure suitable for applications on digital-versatile drums (DVDs) or high-density optical-storage media, wherein base structure 111 is coated with different data media forming a first layer 260, a transparent layer 270, a second layer 280, and then a transparent layer 290, thus establishing four data surfaces 261, 271, 281, and 291 for storing four layers of data thereon. Transparent layers 270 and 290 are made of an identical material with a thickness preferably ranging from 100 to 300 $\mu$m and an index of refraction different from first and second layers 260 and 280, so as to obtain some reflection at data surfaces 261, 271, 281, and 291.

FIG. 3 shows an enlarged top side view of data tracks 300 on a single data surface made currently of an evaporated aluminum film. As detailed in an exaggerated circular view 305, data tracks 300 each comprises a plurality of pits 310 with a width of 0.4 to 0.5 $\mu$m and a depth of 0.1 $\mu$m and a plurality of flats 311, wherein the flats 311 and pits 310 provide on and off digital signals when interfaced with a laser beam. The distance between adjacent tracks (or the so-called track pitch) is held constant at 1.6 $\mu$m for a CD-comparable format, versus 0.74 $\mu$m for a DVD-comparable format. These tracks are in fact arranged in a continuous helix with centers falling onto an imaginary straight center line 301, so that when rotated about imaginary straight center line 301, all data can be readily accessed by an optical head (to be shown in FIG. 5) traveling in a single direction parallel to imaginary straight center line 301 and in close proximity to the data surface. To the contrary, in a conventional optical CD drive, an optical head moves in a radial direction relative to a disc or disk, that is in a direction generally perpendicular to an axial line of rotation of a turntable.

FIG. 4 is a perspective view of an optical data-storage cartridge 400 in accordance with a second primary preferred embodiment of the present invention. Optical data-storage cartridge 400 comprises a housing 410 with a narrow opening currently covered by a cover 412, and an optical data-storage medium 420 contained within housing 410. Cover 412 is biased slidably between a normally closed position (current position as shown in FIG. 4) and an opened position (to be shown in FIG. 5). Optical data-storage medium 420 basically includes a single-piece structure 421 with mounting means 422 (only a front one is depicted) extended out of housing 410, so as to be externally engageable and rotatable about an imaginary straight center line 424. Coated on the peripheral surface of structure 421 is an optical medium forming a data surface 423 responsive to a laser light beam for providing optical signals corresponding to a plurality of data bits stored thereon. The peripheral surface and data surface 423 of structure 421 are adapted to allow the plurality of data bits to be arranged in a three-dimensional pattern such as a ring, circular track, helix, coil, spiral, or their combinations with centers substantially falling onto imaginary straight center line 424.

In accordance with the second primary preferred embodiment of the present invention, the opening covered by cover 412 is arranged in such a manner as to allow data surface 423 to be accessed in a direction generally parallel to its axial direction of rotation, that is imaginary straight center line 424 as shown in FIG. 4. To the contrary, the opening of a disc or disk cartridge is designed to allow a disc or disk surface to be accessed in a radial direction of the disk or disk surface, that is in a direction perpendicular to the axial direction of rotation. Thus, the conventional disk or disc cartridge design is not applicable for use in the optical data-storage cartridge of the present invention.

While FIG. 4 shows a single optical data-storage medium, it is preferred that an optical data-storage cartridge will comprise a plurality of the optical data-storage media similarly disposed therein to protect the optical data-storage media and to facilitate removability.

Referring now to FIGS. 5–9, the third primary preferred embodiment will be described in detail hereinbelow.

FIG. 5 is a perspective view of an optical data-storage apparatus 500, currently loaded with optical data-storage cartridge 400 of FIG. 4. Optical data-storage apparatus 500 has a housing 510 forming into an inner space with dimensions just enough for accommodating optical data-storage cartridge 400 therein, when a front openable door 511 is currently opened. As entering the space, cover 412 on optical data-storage cartridge 400 is forced downward by a member 520 so as to render an opening 521 opened and data surface 423 accessible by optical data-storage apparatus 500. The rear mounting means of optical data-storage cartridge 400 is eventually engaged with a mounting means (not shown) connected to a rotating motor 530. Situated on front openable door 511 is a mounting means 512 rotatable about an axis 513 that will establish engagement with mounting means 422 so as to coincide with and to be rotatable about imaginary straight center line 424 when front openable door 511 is closed and locked.

Further comprised in optical data-storage apparatus 500 is an optical unit that basically includes an optical head 550, a driving motor 551, a screw shaft 552, and a sliding rail 553. Driving motor 551 is provided for moving optical head 550 to a predetermined position along the direction of screw shaft 552 and sliding rail 553, which is generally parallel to imaginary straight center line 424, i.e., the axial direction of rotation of data surface 423. Optical head 550 basically comprises a semiconductor laser diode, a lens system (including an objective or focus lens), a collimator, a quarter-wavelength (λ/4) plate polarizing beam-splitting prisms, photosensors, a focusing mechanism, and control circuitry, as known in the art and needed no additional illustration. Nonetheless, in accordance with the present invention, a laser beam emitted from the laser diode is through the objective lens directed to and reflected from the data surface in a direction generally perpendicular to imaginary straight center line 424, that is the common axial line of mounting means 422 and 512 and data surface 423, for obtaining on/off digital signals.

To the contrary, in a conventional optical disc drive, an optical head is designed to travel in a radial direction of the disc surface, that is perpendicular to the axial direction of rotation of the disc and its turntable. Another key difference lies in the fact that a laser light beam of an optical CD drive is directed to and reflected from a disc surface in a direction parallel to the axial direction of rotation of the disc and the turntable. Thus, the design of the conventional optical disc drives is not applicable for use in the optical data-storage apparatus of the present invention.

Optical head 550 can be in a design capable of accessing data stored on various data surfaces arranged at different depths such as optical data-storage medium 110 shown in FIG. 2B of the present invention. For this purpose, optical head 550 will comprise means for focusing a laser light beam sequentially onto a predetermined plurality of distances, i.e., onto each one of the data surfaces, so as to allow the laser light beam to be directed to and a data signal to be reflected from a preselected one of the data surfaces one at a time in a sequential manner. Specifically, optical head 550 may comprise, for example, an electrically-adjustable numerical aperture ring assembly, means for adjusting the distance between an objective lens and a selected data surface, and control circuitry for controlling a focus point onto a predetermined one of the data surfaces. Thus, at a preselected data track, optical head 550 can adjust focusing points for interfacing with all data stored on different data surfaces 261, 271, 281, and 291 shown in FIG. 2B.

Optical head 550 can further be in a design capable of simultaneously reading a predetermined plurality of data bits at a time if data are arranged in a pattern comprising several helixes alternately disposed, as shown in FIG. 6 in accordance with the another preferred embodiment of the present invention. Optical data-storage medium 600 has a single data surface with eight helixes 601–608 alternately disposed, which have centers generally falling onto an imaginary straight center line 610. More specifically, helixes 601–608 each has a plurality of data tracks, wherein adjacent tracks each is associated with a different one of the helixes, so that data tracks 651–658 respectively correspond to helixes 601–608. Repeatedly, Next eight data tracks 659–666 are in the alternate pattern of helixes 601–608. To read eight bits or one byte of data one bit from each data track of a respective helix as depicted in an exaggerated view 630, optical head 550 will comprise at least one lens for collecting a light beam from an optical laser and for shaping the light beam into a narrow-lined light beam 670 then is directed in perpendicular to data tracks 651–658. Narrow-lined light beam 670 has an elongated length along or parallel to the axial direction of rotation of optical data-storage medium 600, and has dimensions just enough to cover eight data bits, each from a respective one of eight data tracks (i.e., 651–658 as currently depicted in FIG. 6). More specifically, the eight data bits are generally aligned with one another in a direction parallel to imaginary straight center line 610, that is the axial direction of rotation of the optical data-storage medium 600 and its data surface. The rotating speed of optical data-storage medium 600 and the traveling speed of narrow-lined light beam 670 are coordinated in such a manner as to advance narrow-lined light beam 670 to interface with next eight data tracks 659–666, after one revolution of rotation. Such an arrangement is unobtainable by any conventional compact discs, because a conventional optical CD drive has to constantly change speeds of rotation when positioned at different tracks. Thus, the combination of a particular optical data-storage medium (FIG. 6) and optical data-storage apparatus 500 (FIG. 5) allows a plurality of data to be simultaneously retrieved in parallel manner. More specifically, parallel data processing is proceeded in a form of one byte (i.e., 8 bits) at a time in the current embodiment of the present invention versus the serial data processing (i.e., one bit at a time) of the conventional optical disc apparatus.

An alternative parallel-processing optical data-storage apparatus of the present invention is shown in FIG. 7. Optical data-storage apparatus 700 comprises eight optical heads 750a–750h equally spaced apart and aligned in a direction parallel to an imaginary straight center line 724 and jointly movable by a same driving motor 751, so as to simultaneously position at eight data tracks with centers falling onto imaginary straight center line 724, that is also the axial line of a rotating motor 730. This configuration allows optical data-storage apparatus 700 not only to proceed with parallel processing but to reduce track access time to ⅛ of FIG. 5. With respect to parallel processing, more specifically, optical data-storage apparatus 700 allows eight data bits to be processed at a time in parallel manner, wherein each one of the eight data bits is associated with a predetermined one of optical heads 750a–h. With a speed of rotation comparable with a 32× CD-ROM drive, optical data-storage apparatus 700 can achieve a throughput of 23 MBps for a 30-mm diameter of optical data-storage medium 723, which exceeds 16.6 MBps of a high-performance hard-disk drive. In fact, the throughput should be higher than 23 MBps based on today's technology because the present invention utilizes the constant angular velocity (CAV) method for the rotation of the medium and an one-dimensional method for the travelling of the optical head. Most importantly, the present embodiment improves throughput through parallel processing instead of raising the speed of rotation. This is particularly advantageous to advance the speed of data writing, because the present embodiment can now afford an adequate length of time to a material for undergoing necessary transformation between different states of phases or to a polymeric carry medium for undergoing necessary softness upon exposed to an intense laser beam so as to allow embedded magnetically-sensitive, metallic crystals to proceed with re-aligning movements.

Figure 9:
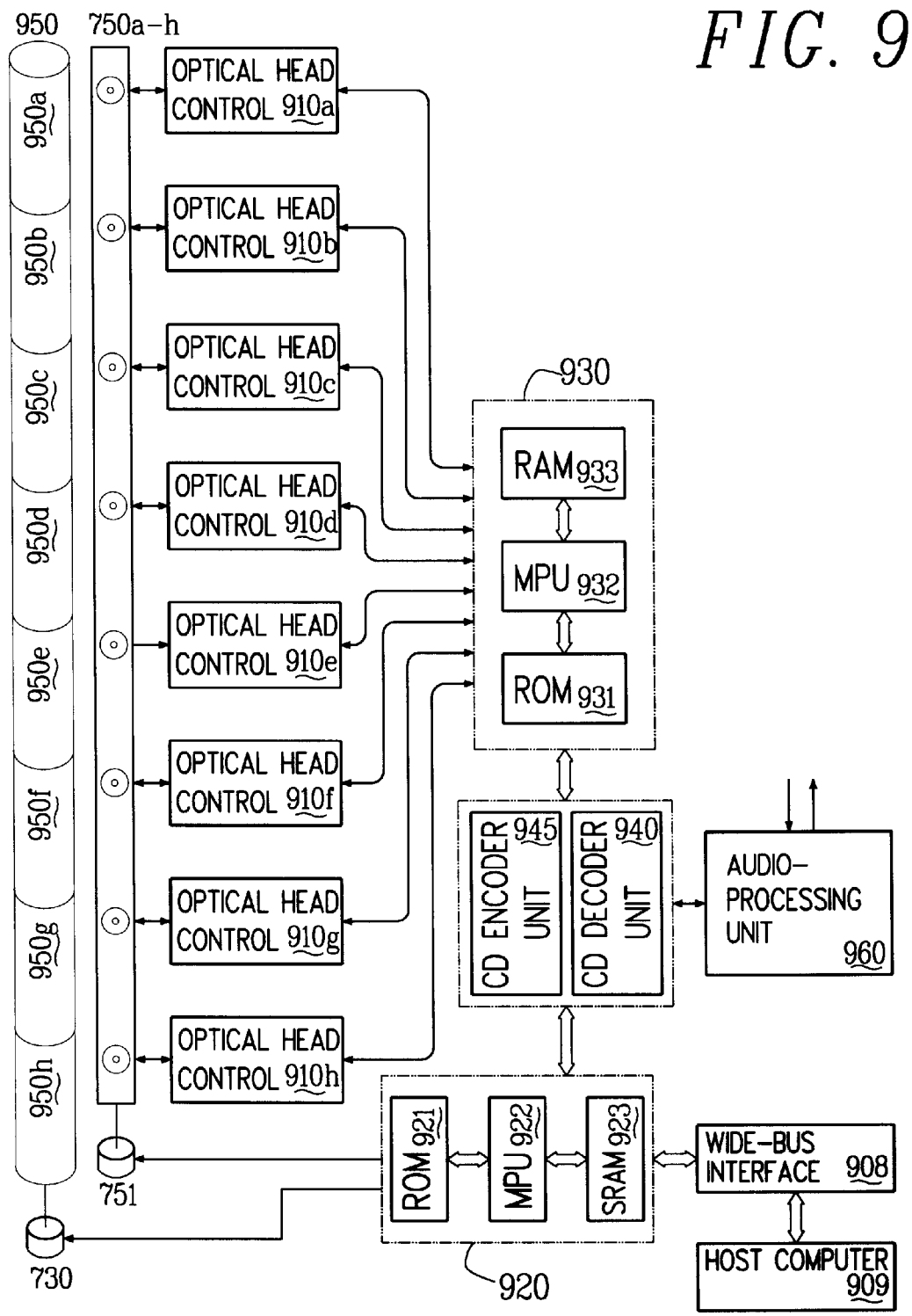
FIG. 9 is a block diagram illustrating a parallel processing for the optical data-storage apparatus shown in FIG. 7 of the present invention.

A multitasking optical data-storage apparatus is shown in FIG. 8. Optical data-storage apparatus 800 comprises two members 820a and 820b for respectively opening covers 812a and 812b so as to render a data surface accessible by optical heads 850a and 850b respectively through narrow openings 821a and 821b on both sides. Optical heads 850a and 850b are movable by separate driving motors 851a and 851b (not depicted) so as to independently position at predetermined track positions along separate screw shafts 852a and 852b, respectively. This configuration renders optical data-storage apparatus 800 capable of independently moving and controlling two optical heads to process two software programs or one complex, multimedia program, i.e., multitasking. Referring now to FIG. 9, another parallel processing for a data format and optical data-storage apparatus 700 of the present invention will be described in detail hereinbelow. FIG. 9 is a block diagram of a control system of the parallel processing of FIG. 7 of the present invention to be used in conjunction with a data pattern comprising eight helixes 950*a*–950*h* (each comprising a plurality of data tracks) separately arranged in such a manner that optical heads 750*a*–750*h* each is positioned at a respective one of the eight helixes. More specifically, a plurality of data constituting a software program are evenly distributed in a predetermined plurality of helixes (i.e., eight currently) discretely disposed at a respective plurality of predetermined positions (i.e., eight currently), so as to allow a predetermined plurality of data bits (i.e., eight currently) to be processed at a time, i.e. in parallel manner.

Optical heads 750*a*–750*h* are jointly and commonly moved by driving motor 751 and only need to travel the length of a helix, about 15 mm in this preferred embodiment, which is about ¼ of an optical head needed to travel in a conventional 120-mm CD. Optical head controls 910*a*–910*h* are provided to independently control optical heads 750*a*–750*h* for focusing (which includes changing focus points of a light beam onto a predetermined plurality of data surfaces arranged at a respectively predetermined plurality of depths as needed for accessing information stored in a DVD-comparable format) and tracking. Optical data-storage medium 950 is rotated by rotating motor 730 in a high-speed constant angular velocity (CAV) method; in contrast, a conventional optical-disc drive is inherently slow in performance because it needs to constantly change and adjust rotating speeds to achieve a constant linear velocity for its optical head. Driving motor 751 and rotating motor 730 are controlled by a system control unit 920, which accepts control signals from a host computer 909 through a wide-bus interface 908.

System control unit 920 basically comprises a ROM (read only memory) 921, a microprocessor (MPU) 922, and a SRAM (static random-access memory). Stored in ROM 921 are instructions needed for enabling MPU 922 to coordinate the operations of a conversion unit 930, a CD decoder unit 940, a CD encoder unit 945, and for interfacing with host computer 909 through wide-bus interface 908. MPU 922 is provided for executing of the instructions stored in ROM 921 in accordance with signals received from host computer 909. SRAM 923 is afforded for serving as a buffer. Each of helixes 950*a*–950*h* can be an individual optical cylinder having a plurality of data tracks in one or several helixes, corresponding to a software optical disc. Thus, SRAM 923 further serves as primary storage for storing basic information such as the read-only or erasable/rewritable nature of data information and directory-structure information or path tables contained in helixes 950*a*–950*h*, allowing optical data-storage apparatus 700 to instantly determine the very helixes or the optical data-storage medium with which a new task is to be executed. In brief, use of the SRAM eliminates the need to refresh the contents of the information/instructions many times a second; thus, the information/instructions can be retained through power of a battery.

Each set of eight data signals retrieved at a time by optical heads 750*a*–750*h*, which correspond to eight channels, are processed by a conversion unit 930 so as to be combined together in a predetermined sequence. Conversion unit 930 basically comprises a ROM 931 stored therein instructions for use in data combination when reading and in data separation when writing, a MPU 932 for executing the combination and the separation, and a RAM (random-access memory) 933 for serving as a buffer needed in data combination and separation processes. Each of helixes 950*a*–950*h* can be an individual optical cylinder having a plurality of data tracks in one or several separate helixes, corresponding to a software optical disc.

The combined data are sent to a CD decoder unit 940 which may comprise a CIRC (Cross Interleaved Reed-Solomon Code) decoder, a CD-ROM decoder, and a RAM in order for the combined data to be deinterleaved, demodulated, and decoded for error-correction process, restoring the original sequence of data symbols, and finally converting the 14-bit word back to the original 8-bit data symbols. The processed data controlled under system control unit 920 are sent to an audio-processing unit 960 or through wide-bus interface 908 to host computer 909. Audio-processing unit 960 comprises a digital-to-analog converter for sound reproducing and an analog-to-digital converter for digitizing analog signals to be stored.

In the process of data writing, audio information is first processed by the analog-to-digital converter of audio-processing unit 960. The digitized audio information is then processed by a CD encoder unit 945 so as to be transformed into an EFM (eight-to-fourteen modulation) format suitable for CD storage. The CD-formatted information is further separated by conversion unit 930 into eight channels or sets of information each transmitted to a respective one of optical heads 750*a*–750*h* through optical head controls 910*a*–910*h* so as to store the separated data onto respective helixes 950*a*–950*h* simultaneously. Similarly, any information received from host computer 909 through wide-bus interface 908 can be processed in parallel manner so as to store information at an eight-fold speed of the serial data processing of the conventional optical-disc drive.

Optical data-storage apparatus 700 along with the parallel processing shown in FIG. 9 will improve the speed of data processing by an order of magnitude, in view of the fact that the conventional optical-disc drive has to constantly change and adjust rotating speeds to arrive at a constant linear velocity in order for its optical head to preform data reading or writing.

Figure 10:
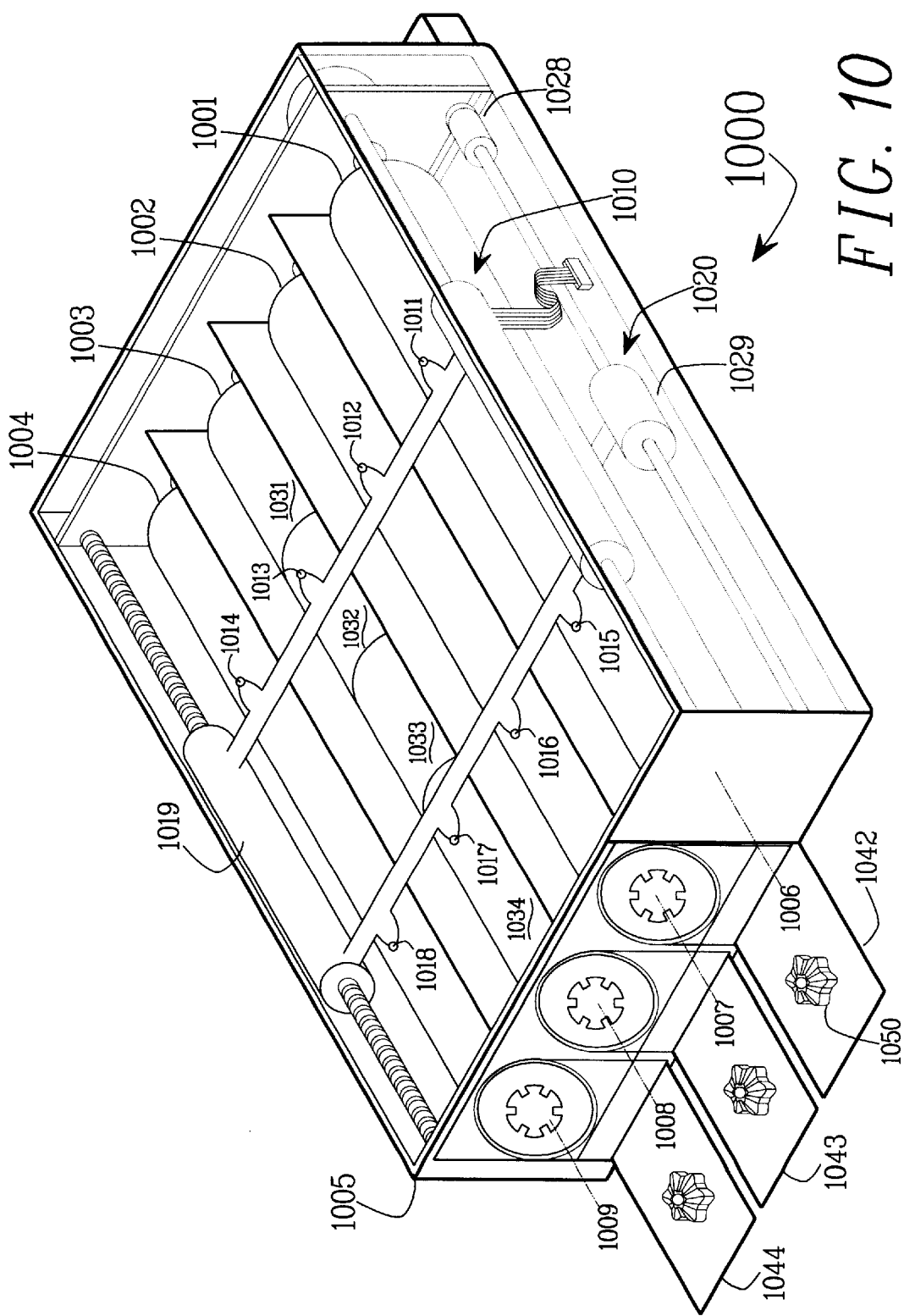
FIG. 10 is a perspective top view of an optical data-storage apparatus having parallel-processing, multitasking, and removable functions capable of serving as a master drive, in accordance with a four primary preferred embodiment of the present invention.

The fourth primary preferred embodiment of the present invention is illustrated in FIG. 10, in which optical data-storage apparatus 1000 is made to have complete functions of serving as secondary and tertiary storage, and most importantly to process information in parallel processing and in multitasking. The construction of optical data-storage apparatus 1000 is based on a single-platform structure, i.e., a single type of data-storage media and data access mechanisms controlled within single system circuitry. To the contrary, any one of conventional computer systems achieves second and tertiary storage by means of combining a hard-disk drive, a floppy-disk drive, a CD drive, and/or a removable drive separately built and controlled, which can process information neither in true multitasking nor parallel processing.

Comprised in a housing 1005 (with its top cover removed) of optical data-storage apparatus 1000 are four compartments for storing one stationary optical data-storage medium 1001 rotatable about an axial line 1006, and three removable optical data-storage media 1002–1004 (with respective openable front doors 1042–1044 currently opened) respectively rotatable about axial lines 1006–1008. Situated on the inner panels of front doors 1042–1044 are three engagement means 1050 for removably mounting respective optical data-storage media 1002–1003 thereon in a manner coinciding with axial lines 1006–1008. Optical data-storage medium 1003 in fact contains optical data-storage media 1031–1034 each having a plurality of data tracks arranged in a single helix, so that data tracks of a helix are discretely disposed from data tracks of other helixes. Such a discrete helix of data tracks can be representative of an original software optical medium. For examples, optical data-storage media 1031–1032 are respectively future software products of Microsoft Windows® 99, Microsoft® Office 99, Word-Perfect® Suite 10, and Lotus® SmartSuite 99, each of which can be effectively processed by a single optical head through the conventional serial processing. User created files and other off-line archives are stored on optical data-storage medium 1002 which is removable and transportable to other computer systems also made in accordance with the present invention. Optical data-storage medium 1004 can be an audio drum of future products for playing digital music.

Optical data-storage apparatus 1000 has two optical units 1010 and 1020 independently movable by driving means 1019 and 1029 in directions generally parallel to axial lines 1006–1009. Situated on optical unit 1010 are eight optical heads 1011–1018 jointly movable by the common driving means 1019. Optical heads 1011–1018 are arranged in such a manner that each two of them are proximate to a respective one of optical data-storage media 1001–1004, so as to position at two different optical tracks on the same optical data-storage media 1001, 1002, and 1004. This at least allows optical heads 1011 and 1015 to access stationary optical data-storage medium 1001 two data bits at a time, that is the parallel processing mentioned hereinabove. Optical unit 1020 includes four optical heads positioned underneath a selected two of optical data-storage media 1001–1004. The four optical heads are disposed in such a manner as to render axial lines 1006 and 1007 each accessible by two of the four optical heads. In addition to driving means 1029, optical unit 1020 further comprises a second driving means 1028 for traversing the four optical heads to axial lines 1007 and 1009, as well as axial lines 1008 and 1009. Thus, optical data-storage apparatus 1000 can perform true multitasking through optical units 1010 and 1020.

In accordance with the features described hereinabove, optical data-storage apparatus 1000 of FIG. 10 is a master drive aiming to replace any conventional hard-disk drive, CD drive, and removable-disk drive typically equipped in a conventional computer system. This configuration allows several smaller original software program media to be loaded on a common rotating shaft which is not achievable in any conventional practice including my prior invention (U.S. Pat. No. 5,748,575). It further allows a user to launch software programs directly therefrom without going through a tedious software installation process, thus providing a type of copyright protection to software developers.

Figure 11:
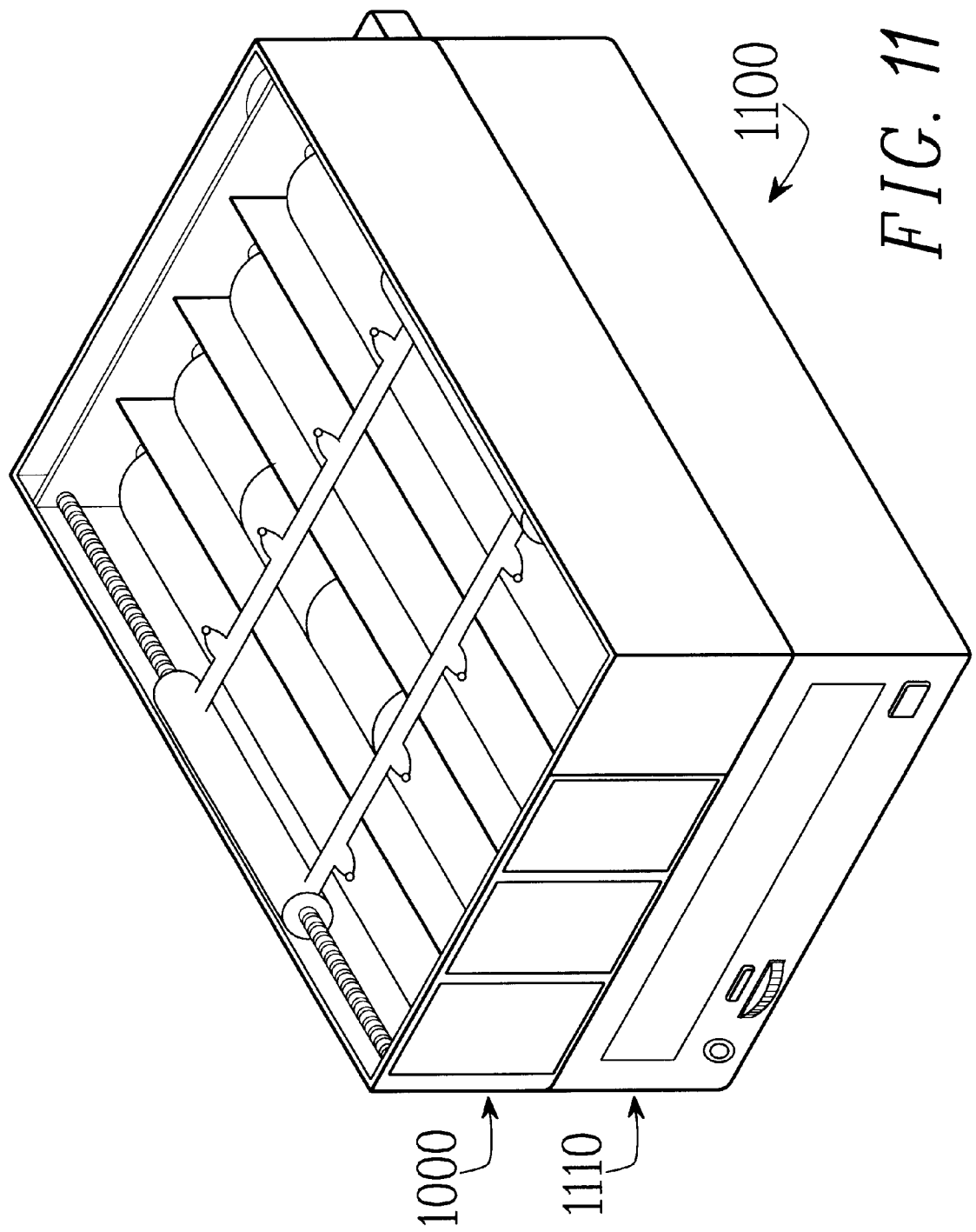
FIG. 11 is a perspective top view of an optical data-storage apparatus capable of processing information stored on the optical data-storage media of the present invention and a conventional optical disc.

FIG. 11 is a perspective top view of an optical data-storage apparatus 1110 capable of interfacing with the optical data-storage media of the present invention and a conventional optical disc medium. With a top cover removed, optical data-storage apparatus 1100 includes optical data-storage apparatus 1000 of FIG. 10 situated on the top and a conventional optical-disc drive situated under the bottom. The conventional optical-disc drive as known in the art comprises a turntable for mounting an optical disc medium rotatable about a turntable axis and a CD optical head means moveable in a radial direction of a disc surface of the optical disc medium. As known, the optical head means is adapted to allow a laser light beam to be directed to and reflected from the disc surface in a direction generally parallel to the turntable axis. In a preferred embodiment, the turntable (not shown in FIG. 11) and optical unit 1020 (shown in FIG. 10) are arranged in such a manner as to allow an optical disc with data surface facing up to be accessed by an additional optical head disposed on optical unit 1020 (FIG. 10). The combination allows a user to access information stored on both types of optical-storage media.

While preferred embodiments of the present invention have been shown and described herein, it will be understood that such embodiments are provided by way of example only. Numerous variations, changes, modification, and substitutions will occur to those skilled in the art without departing from the invention herein. Accordingly, it is intended that the invention be limited only by the spirit and scope of the appended claims.

What is claimed is:

1. An optical data-storage apparatus comprising:
    (a) a plurality of optical-responsive digital data-storage media each adapted to have a data surface for storing a plurality of data arranged in a three-dimensional pattern having an imaginary straight center line;
    (b) a plurality of mounting means each rotatable about an axial line for mounting thereon one of said optical-responsive digital data-storage media in such a manner as to allow said imaginary straight center lines each to coincide with a respective one of said axial lines;
    (c) means for rotating said plurality of mounting means each about a respective one of said axial lines;
    (d) an optical unit comprising a plurality of optical head means and a driving means for simultaneously moving said plurality of optical head means in a direction generally parallel to at least one of said axial lines; and
    (e) means capable of processing digital signals for allowing said optical unit to interface with said optical-responsive digital data-storage media in digital manner.

2. The optical data-storage apparatus of claim 1, wherein said plurality of optical head means each is adapted to provide a light beam directed to and reflected from a respective one of said data surfaces in a direction generally perpendicular to a respective one of said axial lines, so as to selectively write and read digital information thereto and therefrom said optical-responsive digital data-storage media in digital manner.

3. The optical data-storage apparatus of claim 1, wherein one of said plurality of optical head means comprises means for sequentially focusing a light beam selectively between a predetermined plurality of distances, so as to access a respectively predetermined plurality of data surfaces on one of said optical-responsive digital data-storage media.

4. The optical data-storage apparatus of claim 1, wherein one of said plurality of optical head means is adapted to shape a light beam into a narrow-lined light beam with predetermined dimensions to cover a predetermined plurality of data bits adjacently aligned with each other in a direction generally parallel to one of said axial lines, so as to interface with said optical-responsive digital data-storage medium in parallel manner.

5. The optical data-storage apparatus of claim 1, wherein said plurality of optical head means are aligned with each other in a direction generally parallel to a predetermined one of said axial lines, so as to allow a selected plurality of said optical head means to simultaneously access a respectively predetermined one of said optical-responsive digital data-storage media.

6. The optical data-storage apparatus of claim 1, wherein said means capable of processing is adapted to process a predetermined plurality of data bits each associated with a predetermined one of said plurality of optical head means in parallel manner.

7. The optical data-storage apparatus of claim 6, wherein said means capable of processing is provided selectively for combining said predetermined plurality of data bits retrieved by said plurality of optical head means in a predetermined sequence, and for separating data in accordance with said predetermined sequence to a form of said predetermined plurality of data bits to be sent respectively to said plurality of optical head means.

8. The optical data-storage apparatus of claim 1, wherein at least one of said plurality of mounting means each is adapted to removably mount thereon at least one of said plurality of optical-responsive digital data-storage media.

9. The optical data-storage apparatus of claim 1, wherein said plurality of optical head means are arranged in such a manner as to allow at least one of said plurality of optical head means to be positioned at each one of said plurality of optical-responsive digital data-storage media.

10. The optical data-storage apparatus of claim 1, further comprising an additional optical unit having at least one optical head means, a first driving means, and a second driving means, wherein said first and said second driving means are provided for moving said at least one optical head means respectively in a first direction generally parallel to and in a second direction substantially traverse to at least two of said axial lines, so as to allow said second optical unit to selectively access at least two of said optical-responsive digital data-storage media.

11. The optical data-storage apparatus of claim 1 further comprises a turntable rotatable about a turntable axial line for mounting an optical disc medium having a two-dimensional disc surface for storing information thereon.

12. The optical data-storage apparatus of claim 1 further comprises a turntable rotatable about a turntable axial line for mounting an optical disc medium thereon, wherein said turntable and said optical unit are arranged in such a manner as to allow one of said plurality of optical head means to travel in a radial direction of a disc surface of said optical disc medium.

* * * * *